April 21, 1964 H. C. HENDERSON ETAL 3,129,689

TIRE PRESSURE INDICATOR

Filed Nov. 23, 1962

INVENTORS.
HENRY C. HENDERSON
PAUL W. HEATH
BY Elliott & Pastoriza
ATTORNEYS

United States Patent Office 3,129,689
Patented Apr. 21, 1964

3,129,689
TIRE PRESSURE INDICATOR
Henry C. Henderson and Paul W. Heath, both of 332 Standard, El Segundo, Calif.
Filed Nov. 23, 1962, Ser. No. 239,568
4 Claims. (Cl. 116—34)

This invention relates to an improved tire pressure indicator preferably for use with tubeless tires.

Tire pressure indicators for advising a driver when the pressure in his tires decreases below a safe level are well known in the art. Such devices are particularly useful on trucks in which low tire pressure presents a serious problem if not corrected in due course.

Many prior art proposals for tire pressure indicators include rather complicated mechanism wherein, for example, a change in tire pressure actuates suitable controls on the dashboard of the driver's cab such as lights or buzzers to advise him of the tire pressure deficiency. Such devices are not only relatively expensive, but pose maintenance problems.

A more simplified type tire pressure indicator may include a device including a portion in communication with the interior of the tire and an exterior portion for providing a desired indication without the necessity of running controls between the tires and the dashboard in the truck or car. For example, one such prior art device actually explodes a cartridge to provide an audible sound to advise the driver when the tire pressure drops below a predetermined level.

In devices which project from the interior of the tire or rim to the exterior thereof, the projecting portion may be accidentally broken by objects on the road or flying stones with resultant loss in tire pressure. Thus, the provision of such tire indicators could be detrimental rather than a safety feature.

With all of the foregoing in mind, it is a primary object of this invention to provide a greatly improved tire pressure indicator in which the foregoing disadvantages are overcome.

More particularly, it is an object to provide a tire pressure indicator which is extremely economical to manufacture and easy to install and which avoids any control means from the tire to the dashboard to the end that maintenance and the like is minimized.

Another important object is to provide a tire pressure indicator which includes safety features so that if a portion thereof becomes broken, air pressure cannot escape from the tire.

These objects as well as many other objects and advantages of this invention are attained by providing an enclosure incorporating a central diaphragm dividing the enclosure into first and second chambers. The enclosure includes a narrow extending transparent portion adapted to pass through an opening in the rim of a tubeless type tire structure, the main portion of the enclosure being incorporated within the tire and the extending portion passing through the opening in the rim to be visible from the exterior.

Within the enclosure there is provided an indicating means in the form of a rod having one end secured to the diaphragm and its other end free and projecting into the extending portion so as to be visible through the transparent part of the extending portion from the exterior of the tire. The first chamber includes a given pressure corresponding to normal tire pressure, and the second chamber is in pressure communication with the interior pressure of the tire itself. With this arrangement, when the tire pressure is normal, the diaphragm will be substantially centered, and the free end of the indicating rod will project a given distance into the extending portion visible from the exterior of the tire. However, if the tire pressure becomes low, the diaphragm will be moved so as to retract the indicator rod such that it is no longer visible from a casual inspection of the exterior portion.

The invention also contemplates the provision of a novel sealing means cooperating with the diaphragm such that should the extending portion become damaged or broken, the tire pressure will not be lost through the opening in the rim.

The entire structure is relatively simple, economical to manufacture, and easy to install.

A better understanding of the invention will be had by now referring to a preferred embodiment thereof as illustrated in the accompanying drawings, in which.

Figure 1:
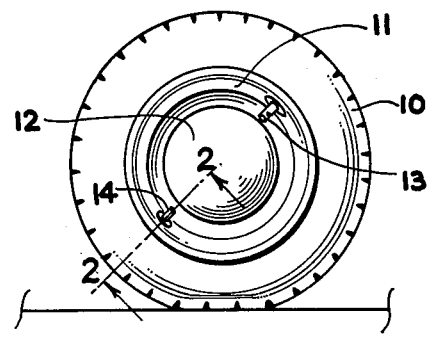
FIGURE 1 is a side elevational view of a tubeless tire wheel with which the instant invention may be used.

Referring first to FIGURE 1, there is shown a tubeless tire 10 mounted on a rim 11 provided with a hub cap 12 all as is conventional. A tire valve 13 is shown projecting through the rim for inflating the tire 10.

In accordance with the invention, there is provided a further opening in the rim 11 through which the tire pressure indicator 14 extends so that the extending portion is clearly visible from the exterior of the tire.

Figure 2:
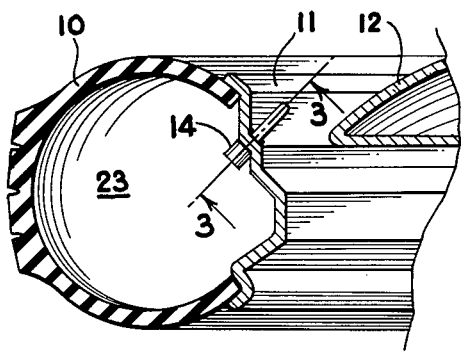
FIGURE 2 is a fragmentary cross section taken in the direction of the arrows 2—2 of FIGURE 1.

Referring to the cross section of FIGURE 2, the rim structure is illustrated in detail wherein it will be noted that the pressure indicator itself has a main enclosing portion within the tubeless tire 10 with a narrow tubular shaped extending portion passing through an opening in the rim to be visible from the exterior. The foregoing will be even clearer by referring to FIGURE 3.

Figure 3:
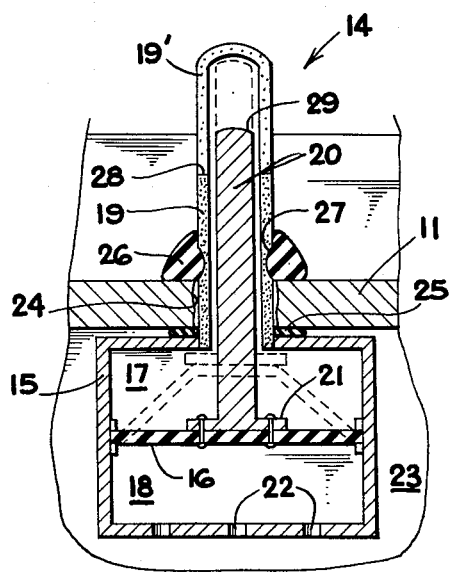
FIGURE 3 is a greatly enlarged cross section taken in the direction of the arrows 3—3 of FIGURE 2; and, FIGURE 4 is a view similar to FIGURE 3 but illustrating the positions of various movable components as a result of loss of pressure.

As shown in FIGURE 3, the tire pressure indicator 14 includes an enlarged enclosure 15 incorporating a central diaphragm 16 dividing the enclosure into first and second chambers 17 and 18. This enclosure includes an extending portion 19 of tubular shape and including, at least in part, a transparent wall 19′ so that the interior of the extending portion 19 is visible.

Within the enclosure there is provided an indicating means in the form of a rod 20 having one end rigidly secured to the diaphragm 16 as at 21 and its other end free to project within the extending portion 19. The first chamber 17 is hermetically sealed under a given pressure corresponding to normal tire pressure.

The lower or second chamber 18 is in communication by means of openings 22 with the interior 23 of the tire. With this arrangement, the lower side of the diaphragm 16 is subject to actual tire pressure whereas the upper or interior side of the diaphragm is subject to the given pressure within the first chamber 17. The degree of extent of the indicating rod 20 within the extending portion 19 will thus be a function of the position of the diaphragm 16 and this extent will be such that the top portion of the indicator is visible when the tire pressure is normal.

In order to support the tire pressure indicator within the tubeless tire, the extending portion 19 is passed through an opening 24 in the rim 11. An inner annular sealing means in the form of an O-ring 25, for example is positioned about the base of the extending portion 19 so as to be sandwiched between the top of the enclosure 15 and the inner periphery of the rim opening 24. An outer annular holding means in the form of a washer shaped stretchable member 26 in turn is arranged to be received over the extending portion 19 and received within an annular groove 27 in the extending portion so as to provide a seal against the outer peripheral portion of the opening 24. This arrangement simplifies assembly of the device wherein the extending portion 19 is initially simply inserted through the opening 24 when the tire 10 is removed from the rim and then the outer annular stretchable member 26 slid over the extending portion 19 into the groove 27 to bear against the outer peripheral portion of the opening 24. Since the pressure within the tire has a tendency to urge the entire structure out through the opening 24, the primary seal is effected by the inner annular seal 25, the outer annular stretchable member 27 simply serving to hold the structure in place.

As shown, the extending portion 19 includes a division line 28 which may demark the start of the transparent part 19' of the tubular structure. The arrangement is such that if the top 29 of the indicator rod 20 extends above the index mark 28, the tire pressure is normal or within a safe range. However, if the top 29 falls below the index mark 28 so as not to be visible through the transparent portion 19', the tire pressure is too low.

Figure 4:
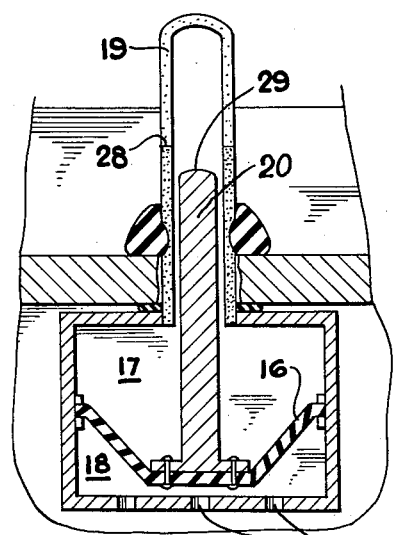

The foregoing will be evident with reference to FIGURE 4 wherein it will be noted that a decrease of tire pressure will result in the given pressure in the first chamber 17 urging the diaphragm 16 downwardly so that the top 29 of the indicator rod is well below the index point 28. The enclosure 15 is so designed that the diaphragm will bottom on the lower portion of the second chamber 18 before the diaphragm 16 is stretched beyond its elastic limit so as not to be damaged should all of the pressure escape from the tire. Similarly, the first chamber 17 is so dimensioned that the diaphragm and rod structure will engage the upper portion of the enclosure 15 should the tire pressure be beyond its normal value or the given pressure within the chamber 17 be reduced.

The foregoing feature is not only important to avoid damage to the diaphragm but also serves as a safety feature in the event that the extending portion 19 passing to the exterior of the rim 11 should become broken. In such event, for example, the pressure within the first chamber 17 would be lost. However, this action would only result in the diaphragm 16 and indicating rod 20 being urged upwardly to the dotted line position illustrated in FIGURE 3 wherein it could not physically travel further and thus would not break. The diaphragm 16 in cooperation with the inner annular sealing means 25 would thus prevent tire pressure within the interior 23 of the tire from escaping through the opening 24 to the exterior.

From the foregoing description, it will thus be evident that the present invention has provided a greatly improved and simplified type of tire pressure indicator. While only one particular embodiment has been set forth and described, various minor changes that fall clearly within the scope and spirit of the invention will occur to those skilled in the art. The tire pressure indicator is therefore not to be thought of as limited to the exact embodiment set forth merely for illustrative purposes.

What is claimed is:

1. A tire pressure indicator for a tubeless tire mounted on a rim in which there is provided an opening through said rim to the interior of said tire, said indicator comprising, in combination: an enclosure; an internal diaphragm dividing the interior of said enclosure into first and second chambers; an extending portion connected to said enclosure and communicating with said first chamber, said portion being at least partly transparent and adapted to pass through said opening when said enclosure is positioned within said tubeless tire so that said portion is visible from the exterior of said tire; and an indicating rod having one end secured to said diaphragm for movement therewith and its other end projecting into said extending portion so as to be visible therethrough when said diaphragm is in a first position, said first chamber being hermetically sealed under a given pressure corresponding to normal tire pressure, said given pressure acting against one side of said diaphragm, and said second chamber being in fluid communication with the interior of said tire so that actual tire pressure acts on the other side of said diaphragm whereby a change in said actual tire pressure moves said diaphragm to vary the position of said rod within said extending portion.

2. An indicator according to claim 1, in which said first and second chambers are dimensioned such that said diaphragm will be blocked from movement into said first chamber beyond a given distance by the end wall opposite said diaphragm in said first chamber and blocked from movement into said second chamber beyond a given distance by the end wall opposite said diaphragm in said second chamber, said given distances being such as to prevent the diaphragm from stretching beyond its elastic limit.

3. An indicator according to claim 2, including an inner annular sealing means surrounding the base of said extending portion so as to be sandwiched between said enclosure and the inner peripheral portion of said opening; outer annular means surrounding said exterior portion on the other side of said opening to hold said enclosure and extending portion in position, said inner annular sealing means and said diaphragm cooperating to prevent air in said tire from escaping through said opening in the event said exterior portion is broken.

4. An indicator according to claim 2, in which said extending portion includes an annular groove adjacent to the exterior portion of said opening, said outer annular means comprising a washer shaped stretchable member receivable over said extending portion into said groove to hold said enclosure in place and provide a seal against the outer peripheral portion of said opening and said extending portion.

References Cited in the file of this patent

UNITED STATES PATENTS

| | | |
|---|---|---|
| 1,289,712 | Evans | Dec. 31, 1918 |
| 1,291,901 | Hurd | Jan. 21, 1919 |
| 1,396,141 | Neptune | Nov. 8, 1921 |
| 1,731,632 | Main | Oct. 15, 1929 |
| 2,225,674 | West | Dec. 24, 1940 |
| 2,738,752 | Dascombe | Mar. 20, 1956 |
| 2,761,411 | Pross et al. | Sept. 4, 1956 |
| 2,798,450 | Higgins | July 9, 1957 |